United States Patent
Guo et al.

(10) Patent No.: US 6,652,937 B1
(45) Date of Patent: *Nov. 25, 2003

(54) COMPOSITE THERMOPLASTIC-ELASTOMER PRODUCT

(75) Inventors: Laina Guo, Montargis (FR); Jean-Yves Mounier, Paucourt (FR)

(73) Assignee: Hutchinson, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/509,576

(22) PCT Filed: Jul. 28, 1999

(86) PCT No.: PCT/FR99/01852

§ 371 (c)(1),
(2), (4) Date: Mar. 29, 2000

(87) PCT Pub. No.: WO00/07810

PCT Pub. Date: Feb. 17, 2000

(30) Foreign Application Priority Data

Jul. 31, 1998 (FR) .............................................. 98 09848

(51) Int. Cl.$^7$ ................ B32B 1/08; F16L 9/14
(52) U.S. Cl. ................ 428/35.7; 428/36.9; 138/143; 138/145
(58) Field of Search ............... 428/35.7, 36.9; 138/143, 145

(56) References Cited

U.S. PATENT DOCUMENTS

| | | | | |
|---|---|---|---|---|
| 4,762,589 A | * | 8/1988 | Akiyama et al. | 156/307.3 |
| 4,851,473 A | * | 7/1989 | Dunphy | 525/66 |
| 5,143,174 A | * | 9/1992 | Cauvy et al. | 138/109 |
| 5,413,147 A | | 5/1995 | Davis et al. | 138/109 |
| 5,488,974 A | * | 2/1996 | Shiota et al. | 138/125 |
| 5,804,269 A | * | 9/1998 | Ozawa et al. | 428/36.91 |
| 5,807,639 A | * | 9/1998 | Frappier et al. | 428/475.5 |
| 6,068,026 A | * | 5/2000 | Garois | 138/126 |

FOREIGN PATENT DOCUMENTS

| | | |
|---|---|---|
| DE | 195 31 224 | 3/1996 |
| DE | 19531224 | * 3/1996 |
| EP | 0818477 | * 1/1998 |
| EP | 0 818 477 | 1/1998 |
| JP | 03050262 | * 3/1991 |
| JP | 08034886 | * 2/1996 |
| WO | 94 19638 | 9/1994 |
| WO | 9419638 | * 9/1994 |

OTHER PUBLICATIONS

English Language Abstract of JP 03 050262.
English Language Abstract of JP 08 034886.

* cited by examiner

*Primary Examiner*—Harold Pyon
*Assistant Examiner*—Marc Patterson
(74) *Attorney, Agent, or Firm*—Lowe Hauptman Gilman & Berner, LLP

(57) ABSTRACT

Thermoplastic/elastomer composite product, in particular a hose for transporting a coolant for an automobile air-conditioning circuit, comprising an internal layer formed from a plastic alloy comprising a nylon-6 and at least 51% of a modifier chosen from among ethylene-acrylate-acrylic acid terpolymers and a layer formed from a blend of an elastomer, such as a brominated butyl rubber modified by a grafted 1,2-vinyl polybutadiene, a silane, an ethylene-acrylic acid copolymer or an ethylene-propylene copolymer grafted with maleic anhydride, with complete adhesion between the thermoplastic and the elastomer.

18 Claims, 1 Drawing Sheet

COMPOSITE THERMOPLASTIC-ELASTOMER PRODUCT

The invention relates to a thermoplastic/elastomer composite product such as, for example, a hose for transporting a coolant for an automobile air-conditioning circuit.

These products must meet increasingly stringent standards, especially with regard to their thermal behavior (both internal and external), their resistance to external agents and, when they are hoses, their impermeability with respect to the fluid transported. In addition, their lifetime must be as long as possible and their sealing and impermeability properties must be maintained throughout this lifetime.

It has been proposed many times to produce thermoplastic/elastomer composite hoses for transporting fluids in the automobile industry, these hoses generally having an internal layer of polyamide, an elastomer layer covering the polyamide, a textile reinforcement and an external protective layer made of rubber or elastomer.

In these known hoses, it is often necessary to make a compromise between the desired flexibility and the impermeability to the fluid transported and a thin layer of a suitable adhesive material must furthermore be placed between the thermoplastic and the elastomer in order ensure that they adhere to each other.

In the case of hoses for transporting the coolant for an air-conditioning circuit, it is necessary to improve the impermeability to the fluid transported (the coolants which have been used hitherto and contained CFCs are being replaced by HFCs known by the name R134a, these being combined with a lubricant of the polyalkylene glycol type) and a blend of a polyamide, of a polyolefin modified by grafting and of ε-caprolactam has, for example, been proposed for this internal layer, but this composition does not adhere to the layer of elastomer that covers it. In addition, the amount of ε-caprolactam used is a compromise between flexibility and fluid impermeability, the addition of ε-caprolactam making it possible to improve the flexibility to the detriment of the impermeability.

This is why the Applicant gave itself the task of providing a composite product which meets the practical requirements better, especially in that there is complete adhesion between the thermoplastic and the elastomer as well as excellent impermeability to the fluids transported (in the case of a hose) and especially to the new coolants which are used in automobile air-conditioning circuits.

For this purpose, the invention proposes a composite product comprising an internal layer of a blend of a thermoplastic and of a modifier, said layer being covered with a layer of a blend of an elastomer and of a modifier, wherein:

the internal layer essentially consists of a plastic alloy comprising a thermoplastic chosen from among polyamides (PA) and at least one modifier chosen from among ethylene-acrylate-acrylic acid terpolymers, the thermoplastic/ethylene-acrylate-acrylic acid terpolymer proportions being between 10/90 and 49/51 (by weight); and the elastomer is chosen from among natural rubber (polyisoprene or NR), synthetic polyisoprene (IR), nitrile rubbers (NBR), halogenated nitrile rubbers, hydrogenated nitrile rubbers, epichlorhydrin-ethylene oxide copolymers (ECO), ethylene-acrylic acid elastomers, butyl rubbers (isoprene-isobutylene copolymers or IIR), halogenated butyl rubbers (XIIR), isobutylene-p-methylstyrene para-bromomethylstyrene elastomers, ethylene-propylene-diene terpolymers (EPDM) and ethylene-propylene copolymers (EPM), chlorinated polyethylene (CM), chlorosulfonated polyethylene (CSM), chlorosulfonated polyethylene having alkyl side groups (ACSM), polychloroprene (CR), acrylic polymers (ACM), ethylene-vinyl acetate copolymers (EVA) and ethylene-acrylate copolymers (EAM), at least one modifier, which modifies the elastomer, being chosen from among 1,2-vinyl polybutadienes grafted with maleic anhydride, epoxidized and/or hydroxylated polybutadienes, silanes, ethylene-acrylic acid elastomers and ethylene-propylene copolymers grafted with maleic anhydride.

According to the invention, the polyamide is selected from the group consisting, inter alia, of nylon-6, nylon-6,6, nylon-11, nylon-12, nylon-6/10 and nylon-6/12.

It has been found that, in these products, there is complete adhesion between the thermoplastic and the elastomer without it being necessary to use an interlayer of an adhesive, and that it is impossible to separate the thermoplastic and elastomer layers without destroying them.

It has also been found that insofar as the proportions of modifiers in the thermoplastic are always greater than the amounts of thermoplastic, they form with the latter a plastic alloy whose manufacture is significantly improved insofar as it is possible to obtain a much more homogeneous dispersion than those obtained with the modified thermoplastics of the prior art, in which the amounts of modifiers are generally less than those of the thermoplastic; such a homogeneous dispersion makes it possible, in particular, to obtain components of very high quality manufactured by extrusion, the elastomer and/or the thermoplastic advantageously including several modifiers.

The proportions of modifiers in the elastomer may vary very widely and are, in general, between 0.5 and 50% approximately.

The thermoplastic and/or the elastomer used may also include at least fillers, either organic or inorganic, as well as the usual plasticizers.

The invention also proposes a hose for transporting a coolant for an automobile air-conditioning circuit, comprising an internal layer of the thermoplastic and a layer of the elastomer which have just been described, in which hose the thickness of the internal layer of thermoplastic is approximately 0.05 to 2 mm, that of the layer of elastomer being approximately 0.2 to 3 mm.

Such a hose also includes one or more textile reinforcement layers covering the layer of elastomer and itself covered with a protective layer made of elastomer.

A thin layer of elastomer may also be provided on the internal face of the layer of thermoplastic, in order to improve the sealing when the hose is fitted onto a connection nozzle.

In a preferred embodiment of the invention, the aforementioned thermoplastic is a blend of 35 to 45% (w/w) of polyamide, preferably nylon-6, and of 55 to 65% (w/w) of an ethylene-acrylate-acrylic acid terpolymer.

The invention will be better understood and other features, details and advantages thereof will appear more clearly on reading the description which follows, given by way of example with reference to the appended drawings in which.

Figure 1:
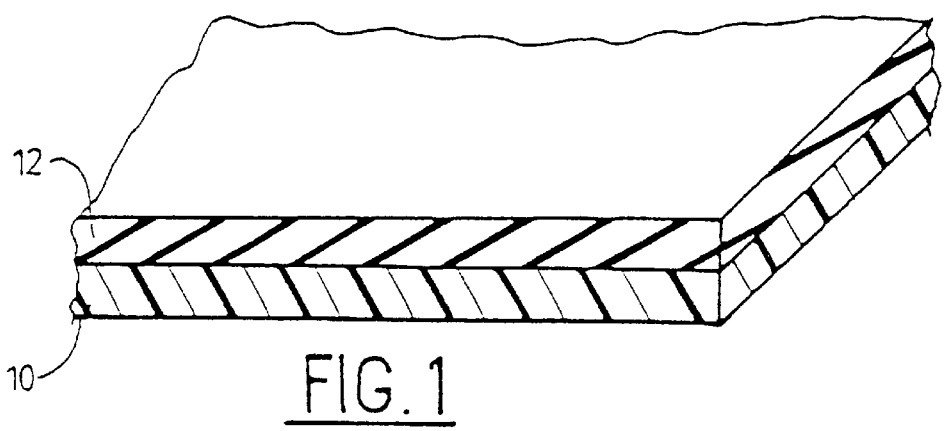
FIG. 1 is a partial schematic view, in cross section, of a composite product according to the invention.

The composite product according to the invention, which is shown schematically in FIG. 1, comprises a layer 10 of thermoplastic covered with a layer 12 of elastomer, the adhesion of these two layers to each other being such that any attempt to separate these two layers results in the destruction of one and/or both of these layers.

The thermoplastic of the layer 10 may be chosen from among the following compounds: PA-6, PA-6,6, PA-11, PA-12, PA-6/10 and PA-6/12, as a blend with an ethylene-acrylate-acrylic acid terpolymer in proportions of between 10/90 and 49/51 (w/w). This modifier may optionally be combined with other modifiers.

The layer 12 of elastomer is based on an elastomer chosen from among the following compounds: NR, IR, NBR, XNBR, HNBR, ECO, EPDM, EPM, CM, CSM, ACSM, CR, ACM, EVA, EAM, ethylene-acrylic acid copolymers, butyl rubbers, halogenated butyl rubbers and isobutylene-p-methylstyrene para-bromomethylstyrene, with the addition of at least one of the following modifiers: a 1,2-vinyl polybutadiene grafted with maleic anhydride or with another carboxylic acid anhydride, or epoxidized and/or hydroxylated polybutadienes, silanes, ethylene-acrylic acid copolymers and ethylene-propylene copolymers grafted with maleic anhydride.

Several of these modifiers, which modify the elastomer, may be added in a proportion of between 0.5 and 50% by weight.

Figure 2:
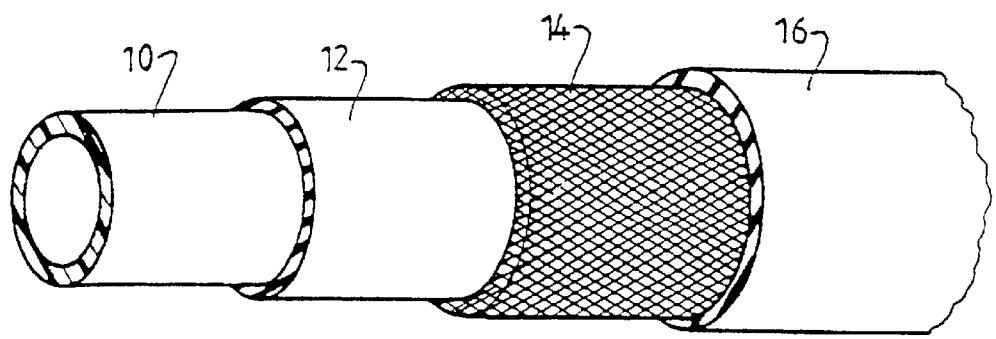
FIG. 2 is a partial schematic view, in perspective, of a hose according to the invention.

The hose shown schematically in FIG. 2 is intended for transporting a coolant of the HFC type used in automobile air-conditioning circuits and comprises an internal layer 10 of thermoplastic having the same composition as the layer 10 in FIG. 1, a layer 12 of elastomer surrounding the layer 10 of thermoplastic and having the composition of the layer 12 in FIG. 1, a textile reinforcement 14 surrounding the layer 12 of elastomer, this textile reinforcement possibly being a braid of polyester yarns, polyamide yarns, etc., and a protective layer 16 made of a suitable elastomer which may be of the same type as that of the layer 12 or different.

Typically, the thickness of the thermoplastic-based internal layer 10 is about 0.1 to 0.3 mm and that of the elastomer-based layer 12 is 0.5 to 2 mm approximately.

A thin layer of elastomer may cover the internal surface of the thermoplastic-based layer 10 in order to improve the sealing when the hose is fitted onto a connection nozzle or the like.

For example, the compositions of the layers 10 and 12 of the hose in FIG. 2 may be the following:

| layer 10: | |
| --- | --- |
| PA-6 | 41 parts by weight |
| ethylene-acrylate-acrylic acid terpolymer | 59 parts by weight |

(DU PONT DE NEMOURS (ZYTEL® ST 7301) or BASF (LUCALEN® 2920), for example)

| layer 12: | |
| --- | --- |
| brominated butyl rubber | 100 parts by weight |
| carbon black | 80 parts by weight |
| reactive phenolic resin | 9 parts by weight |
| plasticizer | 5 parts by weight |
| 1,2-vinyl polybutyldiene grafted with maleic anhydride | 5 parts by weight |
| or | |

| layer 12: | |
| --- | --- |
| isobutylene-p-methylstyrene para-bromomethylstyrene | 100 parts by weight |
| carbon black | 80 parts by weight |
| plasticizer | 5 parts by weight |
| ZnO | 2 parts by weight |
| ZDBC | 2 parts by weight |
| 1,2-vinyl polybutadiene grafted with maleic anhydride | 5 parts by weight |

What is claimed is:

1. A composite product, comprising a first layer being covered with a second layer of a blend of an elastomer and a modifier, wherein:

the first layer comprises a plastic alloy comprising a thermoplastic chosen from among polyamides (PA) and at least one modifier chosen from among ethylene-acrylate-acrylic acid terpolymers, wherein the ratio $W_T/W_{TP}$ of the weight of the thermoplastic in the alloy, designated as $W_T$, to the weight of the ethylene-acrylate-acrylic acid terpolymer in the alloy, designated as $W_{TP}$, ranges from 10/90 to 49/51; and the elastomer is selected from the group consisting of natural rubber (polyisoprene or NR), synthetic polyisoprene (IR), nitrile rubbers (NBR), halogenated nitrile rubbers, hydrogenated nitrile rubbers, epichlorhydrin-ethylene oxide copolymers (ECO), ethylene-acrylic acid elastomers, butyl rubbers (isoprene-isobutylene copolymers or IIR), halogenated butyl rubbers (XIIR), an elastomer copolymer of isobutylene-p-methylstyrene and para-bromomethylstyrene ethylene-propylene-diene terpolymers (EPDM) and ethylene-propylene copolymers (EPM), chlorinated polyethylene (CM), chlorosulfonated polyethylene (CSM), chlorosulfonated polyethylene having alkyl side groups (ACSM), polychloroprene (CR), acrylic polymers (ACM), ethylene-vinyl acetate copolymers (EVA) and ethyleneacrylate copolymers (EAM), at least one modifier, which modifies the elastomer, being chosen from among 1,2-vinyl polybutadienes grafted with malefic anhydride, epoxidized and/or hydroxylated polybutadienes, silanes, ethylene-acrylic acid elastomers and ethylene-propylene copolymers grafted with maleic anhydride.

2. The product as claimed in claim 1, wherein the polyamide is selected from the group consisting of nylon-6, nylon-6,6, nylon-11, nylon-12, nylon-6/10 and nylon-6/12.

3. The product as claimed in claim 1 wherein the proportion of modifier in the elastomer is between 0.5 and 50% by weight approximately.

4. The product as claimed in claim 1, wherein the elastomer and/or the thermoplastic includes at least two of the aforementioned modifiers.

5. The product as claimed in claim 1, wherein the thermoplastic and/or the elastomer include at least fillers, either organic or inorganic, and/or plasticizers.

6. The product as claimed in claim 1, wherein the aforementioned thermoplastic is a blend of 35 to 45% (w/w) of polyamide and of 55 to 65% (w/w) of an ethylene-acrylate-acrylic acid terpolymer.

7. A hose for transporting a coolant for an automobile air-conditioning circuit, comprising an internal layer of thermoplastic covered with a layer of elastomer which have the compositions described in claim 1, wherein the thickness of the layer 10 of thermoplastic is from 0.05 to 2 mm approximately and that of the layer (12) of elastomer is from 0.2 to 3 mm approximately.

8. The hose as claimed in claim 7, wherein the layer (12) of elastomer is covered with at least one textile reinforcement layer (14) and with a protective layer (16) made of elastomer.

9. The hose as claimed in claim 7, which also comprises a thin layer of elastomer from 0.2 to 3 mm in thickness on the internal face of the layer (10) of thermoplastic.

10. The hose as claimed in claim 7, wherein the plastic alloy of the internal layer is a blend of nylon-6 and at least one ethylene-acrylate-acrylic acid terpolymer, the elastomer of the layer covering the thermoplastic being based on isobutylene-p-methylstyrene para-bromomethylstyrene modified by at least one 1,2-vinyl polybutadiene grafted with maleic anhydride.

11. A composite product, comprising a first layer being covered with a second layer of a blend of an elastomer and a modifier, wherein:

the first layer comprises a plastic alloy comprising a thermoplastic chosen from among polyamides (PA) and at least one modifier chosen from among ethylene-acrylate-acrylic acid terpolymers, wherein the weight of the ethylene-acrylate-acrylic acid terpolymer in the alloy is greater than the weight of the thermoplastic in the alloy; and the elastomer is selected from the group consisting of natural rubber (polyisoprene or NR), synthetic polyisoprene (IR), nitrile rubbers (NBR), halogenated nitrile rubbers, hydrogenated nitrile rubbers, epichlorhydrin-ethylene oxide copolymers (ECO), ethylene-acrylic acid elastomers, butyl rubbers (isoprene-isobutylene copolymers or IR), halogenated butyl rubbers (XIIR), an elastomer copolymer of isobutylene-p-methylstyrene and para-bromomethylstyrene ethylene-propylene-diene terpolymers (EPDM) and ethylene-propylene copolymers (EPM), chlorinated polyethylene (CM), chlorosulfonated polyethylene (CSM), chlorosulfonated polyethylene having alkyl side groups (ACSM), polychloroprene (CR), acrylic polymers (ACM), ethylene-vinyl acetate copolymers (EVA) and ethyleneacrylate copolymers (EAM), at least one modifier, which modifies the elastomer, being chosen from among 1,2-vinyl polybutadienes grafted with malefic anhydride, epoxidized and/or hydroxylated polybutadienes, silanes, ethylene-acrylic acid elastomers and ethylene-propylene copolymers grafted with maleic anhydride.

12. The product as claimed in claim 11, wherein the polyamide is selected from the group consisting of nylon-6, nylon-6,6, nylon-11, nylon-12, nylon-6/10 and nylon-6/12.

13. The product as claimed in claim 11, wherein a proportion of the modifier in the elastomer is approximately between 0.5 and 50% by weight.

14. The product as claimed in claim 11, wherein at least one of the elastomer and the thermoplastic includes at least two of the aforementioned modifiers.

15. The product as claimed in claim 11, wherein at least one of the thermoplastic and the elastomer includes at least one of organic or inorganic fillers and plasticizers.

16. The product as claimed in claim 11, wherein the weight percentage of the polyamide in the alloy is in the range from about 35 to 45%, and the weight percentage of the ethylene-acrylate-acrylic acid terpolymer is in the range from about 55 to 65%.

17. The product as claimed in claim 11, wherein said ethylene-acrylate-acrylic acid terpolymer makes up at least 51% by weight of said alloy.

18. The product as claimed in claim 11, wherein a ratio of the weight of the thermoplastic in the alloy to the weight of the ethylene-acrylate-acrylic acid terpolymer in the alloy ranges from 0.11111 to 0.96078.

* * * * *